United States Patent [19]

Fujii

[11] Patent Number: 5,020,005
[45] Date of Patent: May 28, 1991

[54] IMAGE OVERLAY PRINTING CONTROLLING METHOD AND APPARATUS FOR PRINTER

[75] Inventor: Katuyasu Fujii, Tachikawa, Japan

[73] Assignee: Fujitsu Limited, Kawasaki, Japan

[21] Appl. No.: 495,679

[22] Filed: Mar. 16, 1990

[30] Foreign Application Priority Data

Mar. 20, 1989 [JP] Japan ............................... 1-68651

[51] Int. Cl.$^5$ ............................................ G06K 15/00
[52] U.S. Cl. ................................... 364/519; 400/67
[58] Field of Search ............................. 364/518–520, 364/235 MS File, 930 MS File; 400/67, 68, 76; 346/154; 358/296

[56] References Cited

U.S. PATENT DOCUMENTS 4,826,333  5/1989  Tanaka ................................. 400/76
4,944,614  7/1990  Tanaka ................................. 400/68

FOREIGN PATENT DOCUMENTS

63-39947  8/1988  Japan .

*Primary Examiner*—Arthur G. Evans
*Attorney, Agent, or Firm*—Armstrong, Nikaido, Marmelstein, Kubovcik & Murray

[57] ABSTRACT

A controlling method and apparatus for a printer which effects image overlay printing are disclosed. The controlling apparatus comprises an image overlay data storage section, an image overlay data extraction starting position calculating section, and an image overlay controlling section. An extraction starting position of image overlay basic data stored in the image overlay data storage section is normally calculated by the image overlay data extraction starting position calculating section. Consequently, even if image overlay printing is effected over a plurality of print lines, image overlay patterns are not displaced from each other between each adjacent print lines, and a pattern continuous in the upward and downward directions can be obtained.

2 Claims, 9 Drawing Sheets

IMAGE OVERLAY PRINTING CONTROLLING METHOD AND APPARATUS FOR PRINTER

BACKGROUND OF THE INVENTION

This invention relates to an image overlay printing controlling method and apparatus for a printer for carrying out image overlay printing in an overlapping relationship with characters or independently.

A printer which is connected to and used with a personal computer or a word processor normally has a function for carrying out image overlay printing on characters in order to attract attention to a portion to be emphasized. Normally, image overlay data are produced by a personal computer or a word processor to which a printer is connected, and the printer carries out image overlay printing in accordance with a command from such apparatus. However, a personal computer or a word processor of a certain type does not have a function of image overlay printing, and when printing is to be carried out by a printer connected to such personal computer or word processor, the lack of an image overlay printing function is inconvenient. Thus, a printer has been proposed which itself has an image overlay printing function.

A printer having an image overlay printing function includes an image overlay data storage section in which image overlay basic data for a predetermined total number of columns are stored, and an image overlay controlling section for controlling image overlay printing. In order to carry out image overlay printing with a printer of the type mentioned, if a number of columns (a start column and an end column) for a print line along which image overlay printing is to be effected is designated, then the image overlay controlling section reads out image overlay basic data by a plurality of times from the image overlay storage section and transfers them to a line buffer until the designated column is reached, and after image overlay data for a required number of columns are obtained in the line buffer, a printing controlling section controls a print head to carry out image overlay printing.

According to such a conventional image overlay printing controlling method as described above, however, since image overlay basic data for a predetermined total number of columns are read out successively beginning with the head position, there is a problem that, if image overlay printing of a designated print line is first carried out and then image overlay printing is started from a different column position for a next print line, then image overlay patterns for the adjacent upper and lower print lines become discontinuous at boundary portions, and consequently, image overlay patterns are not linked between the upper and lower print lines.

SUMMARY OF THE INVENTION

Accordingly, it is an object of the present invention to provide an image overlay printing controlling apparatus for a printer which can carry out image overlay printing wherein patterns are continuous to each other even if starting positions of image overlay printing are different between adjacent upper and lower print lines.

It is another object of the present invention to provide an image overlay printing controlling method for a printer which can achieve image overlay printing wherein patterns are continuous to each other even if starting positions of image overlay printing are different between adjacent upper and lower print lines.

In accordance with an aspect of the present invention, there is provided an image overlay printing controlling apparatus for a printer which prints using print data stored in a buffer, comprising image overlay storage means having image overlay basic data for a predetermined total number of columns stored therein, means for calculating, in case image overlay start columns for adjacent upper and lower print lines when image overlay printing is to be effected continuously for at least two print lines are different from each other, a value of a remainder to be obtained by dividing the image overlay start column for the lower print line by the total column number of the image overlay basic data as an image overlay data extraction starting position, and image overlay controlling means for starting extraction of data from a column of the image overlay basic data designated by the value of the remainder calculated by the image overlay data extraction starting position calculating means and for producing a printing command after the extracted data are all stored into the buffer.

In accordance with another aspect of the present invention, there is provided an image overlay printing controlling method for a printer which prints using print data stored in a buffer, comprising the steps of storing image overlay basic data for a predetermined total number of columns into image overlay storage means, calculating, in case image overlay start columns for adjacent upper and lower print lines when image overlay printing is to be effected continuously for at least two print lines are different from each other, a value of a remainder to be obtained by dividing the image overlay start column for the lower print line by the total column number of the image overlay basic data as an image overlay data extraction starting position, starting extraction of data from a column of the image overlay basic data designated by the value of the remainder, and producing a printing command after the extracted data are all stored into the buffer.

The above and other objects, features and advantages of the present invention and the manner of realizing them will become more apparent, and the invention itself will best be understood, from a study of the following description and appended claims, with reference had to the attached drawings showing some preferred embodiments of the invention.

DESCRIPTION OF THE PREFERRED EMBODIMENT

Since it is considered desirable to describe construction and problems of the prior art before a preferred embodiment of the present invention is described in order to facilitate understanding of the present invention, the prior art will first be described with reference to the drawings.

Figure 1:
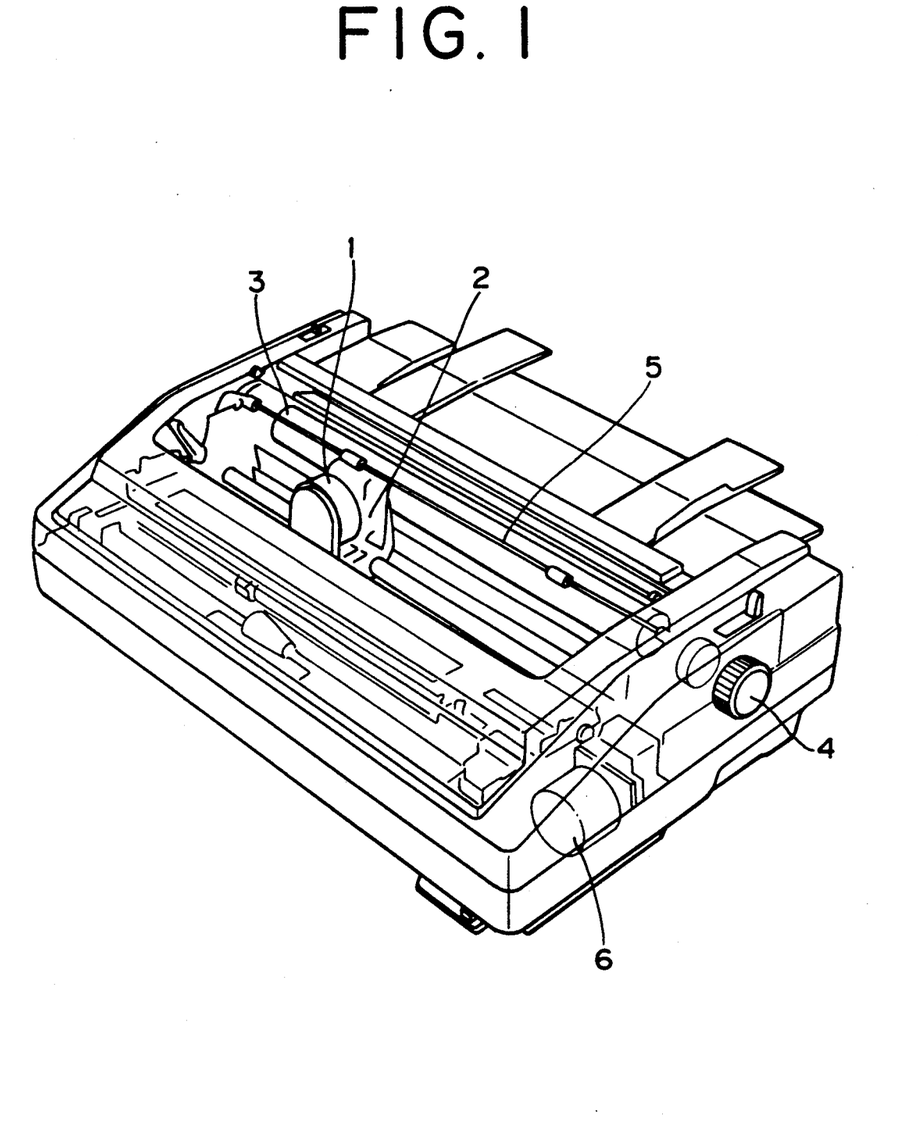
FIG. 1 is a perspective view of a wire dot printer to which the present invention can be applied.

Referring to FIG. 1, there is shown in perspective view a wire dot printer to which the present invention can be applied suitably. Reference numeral 1 denotes a print head for carrying out printing, and the print head 1 is mounted on a carriage 2 which is driven by a carriage motor 6. Reference numeral 3 denotes a platen, and 4 a platen knob for rotating the platen 3. Reference numeral 5 denotes a bail bar for holding paper. The present invention can be applied not only to such a wire dot printer as shown in FIG. 1 but also to other common dot printers such as a thermal printer and an ink jet printer.

Figure 2:
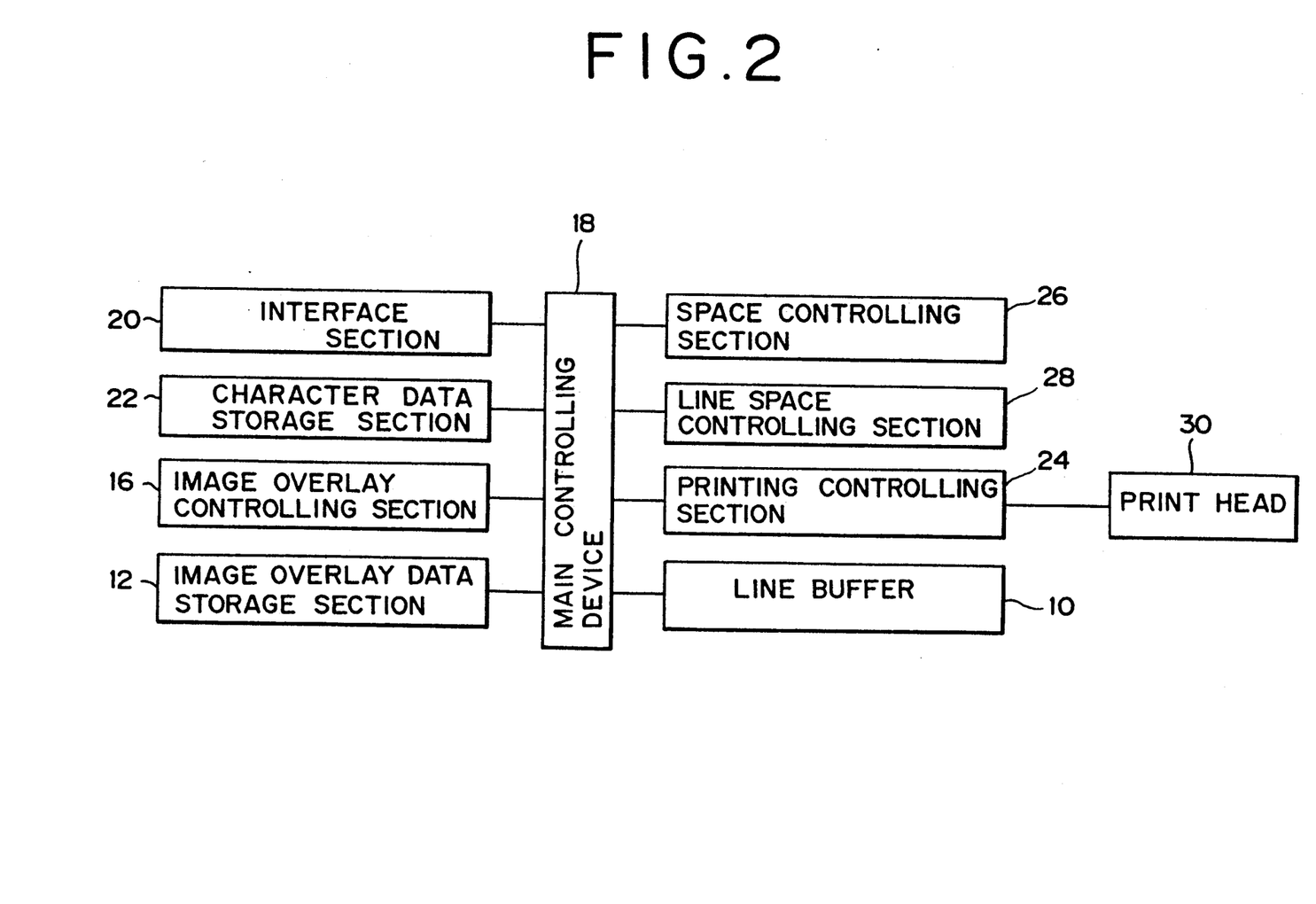
FIG. 2 is a block diagram showing construction of a conventional controlling apparatus.

Subsequently, a conventional image overlay printing controlling method and apparatus will be described with reference to FIGS. 2 to 4B. The printing controlling apparatus includes, as shown in FIG. 2, a main controlling device (MPU) 18 for controlling internal processing operation, an interface section 20 for the interface with the outside, a character data storage section 22 having predetermined character dot patterns stored therein, a printing controlling section 24 for controlling operation of printing processing, a space controlling section 26 for controlling a spacing operation upon printing processing, a line space controlling section 28 for controlling a line spacing operation, a line buffer 28 for storing print data therein, and a print head 30 for printing print data stored in the line buffer 10 under the control of the printing controlling section 24.

For the image overlay printing, the printing controlling apparatus further includes an image overlay data storage section 12 having stored therein image overlay basic data 100 wherein the total number of columns is, for example, 10, and an image overlay controlling section 16 for controlling image overlay printing.

When image overlay printing is to be carried out by the printer having such construction as described above, if a number of columns (a start column and an end column) for a print line for which image overlay printing is to be effected is designated, the image overlay controlling section 16 reads out the image overlay basic data 100 from the image overlay data storage section 12 and transfers them to the line buffer 10 by a number of times until the designated column number is reached. Then, after image overlay data for the required number of columns are obtained in the line buffer 10, the printing controlling section 24 controls the print head 30 to carry out image overlay printing.

Figure 3:
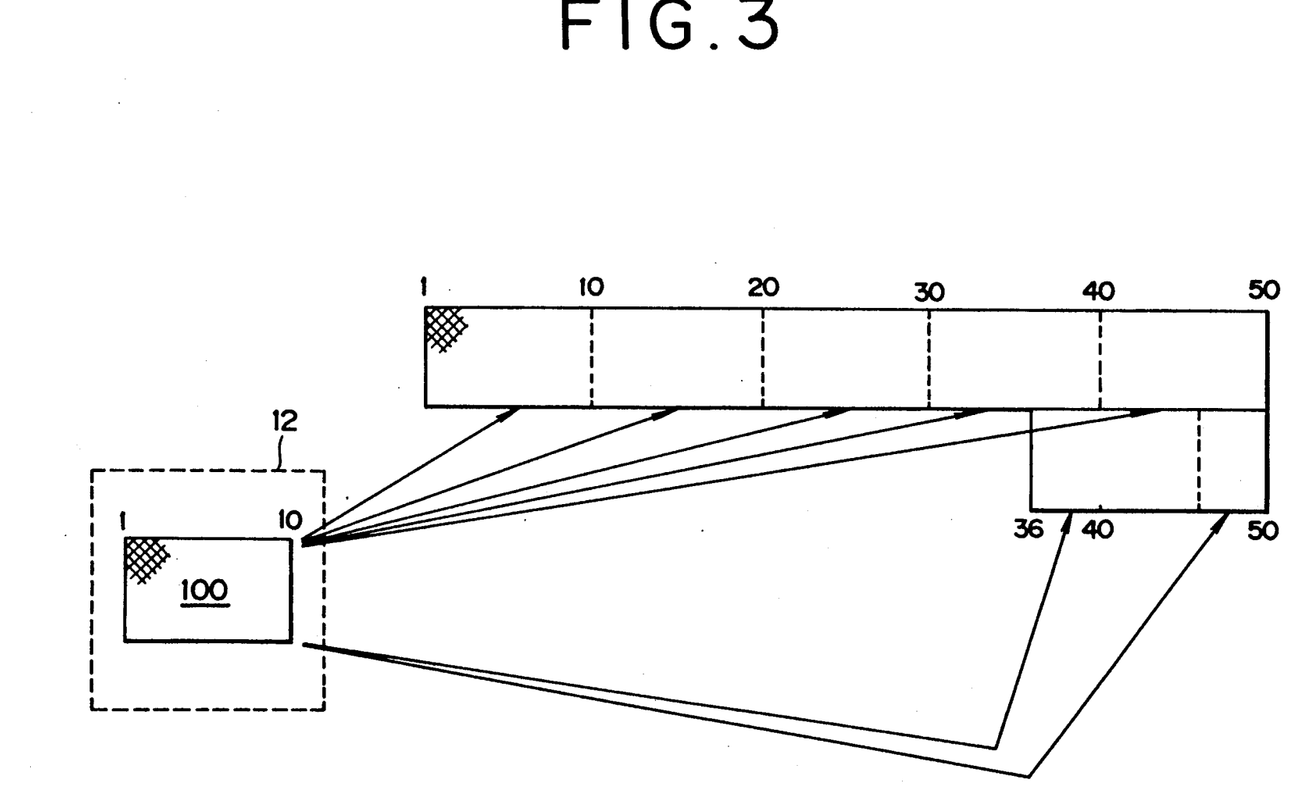
FIG. 3 is a diagrammatic illustration showing a conventional image overlay printing controlling method.
Figures 4A, 4B:
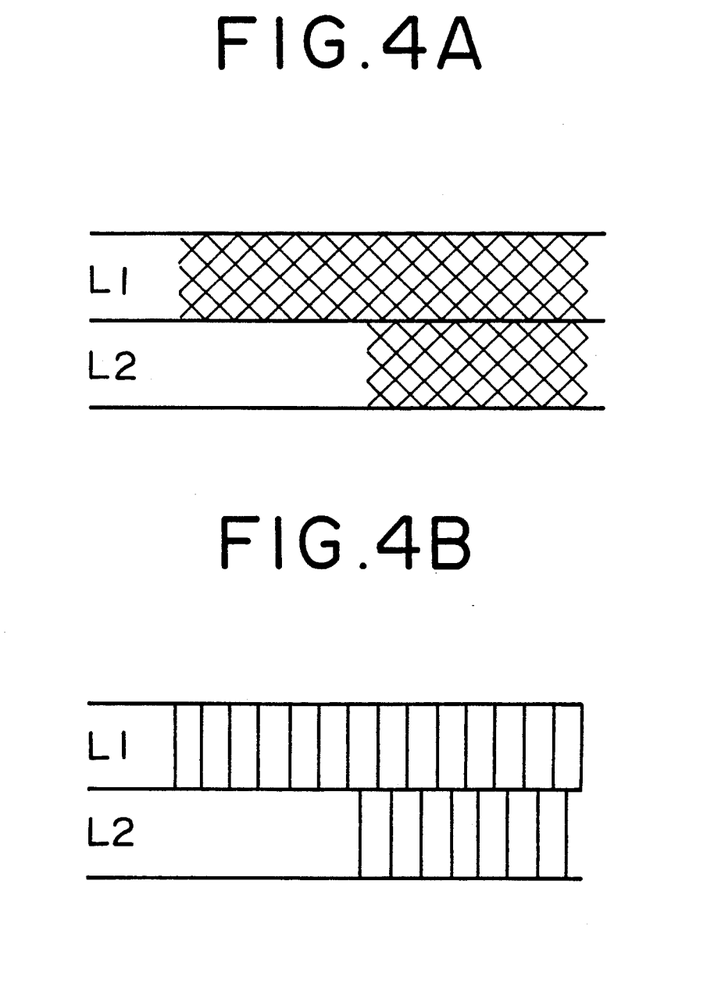
FIG. 4A is a diagrammatic representation illustrating discontinuity of a mesh pattern between an upper print line and a lower print line printed in accordance with the conventional image overlay printing controlling method.
FIG. 4B is a similar view but illustrating discontinuity of a stripe pattern between an upper print line and a lower print line print line printed in accordance with the conventional image overlay printing controlling method.

However, in such image overlay printing based on such conventional printing controlling method, if image overlay printing is effected first for a designated print line L1 and then image overlay printing is started from a different column position for an adjacent next print line L2 as seen in FIG. 3, then image overlay patterns of the upper print line L1 and the lower print line L2 will be discontinuous at boundary portions thereof. Accordingly, there is a problem that image overlay patterns of adjacent upper and lower print lines are not linked to each other as shown in FIGS. 4A and 4B.

More particularly, referring to FIG. 3, it is assumed that each column has a one dot width and designated image overlay printing is effected, for example, from the first column to the 50th column for the upper print line L1. Image overlay data for such image overlay print are produced, since the image overlay basic data 100 for the total column number $A=10$ are stored in the image overlay data storage section 12, by transferring the image overlay basic data 100 by five times to the line buffer 10 and arranging them in the direction of a print line.

Then, if it is assumed that image overlay printing from the 36th column to the 50th column is designated for the subsequent lower print line L2, similarly the image overlay basic data 100 for the total column number $A=10$ are transferred from the image overlay data storage section 12 to the line buffer 10 and allotted to the 36th column to the 45th column, and then those of the image overlay basic data 100 for 5 columns from the head are transferred and allotted to the 46th column to the 50th column.

As a result, the column positions of the image overlay basic data 100 which oppose on the upper and lower sides on the boundary portions of the upper and lower print lines from the 36th column to the 50th column are different from each other as seen from the followings:

L1: "6, 7, 8, 9, 10, 1, . . . , 10"
L2: "1, 2, 3, 4, 5, 6, . . . , 4"

Accordingly, the image overlay patterns of the upper and lower print lines are not linked as seen in FIGS. 4A and 4B.

The present invention has been made to solve such problem of the prior art. In the following, the present invention will be described in detail with reference to FIGS. 5 to 10.

Figure 5:
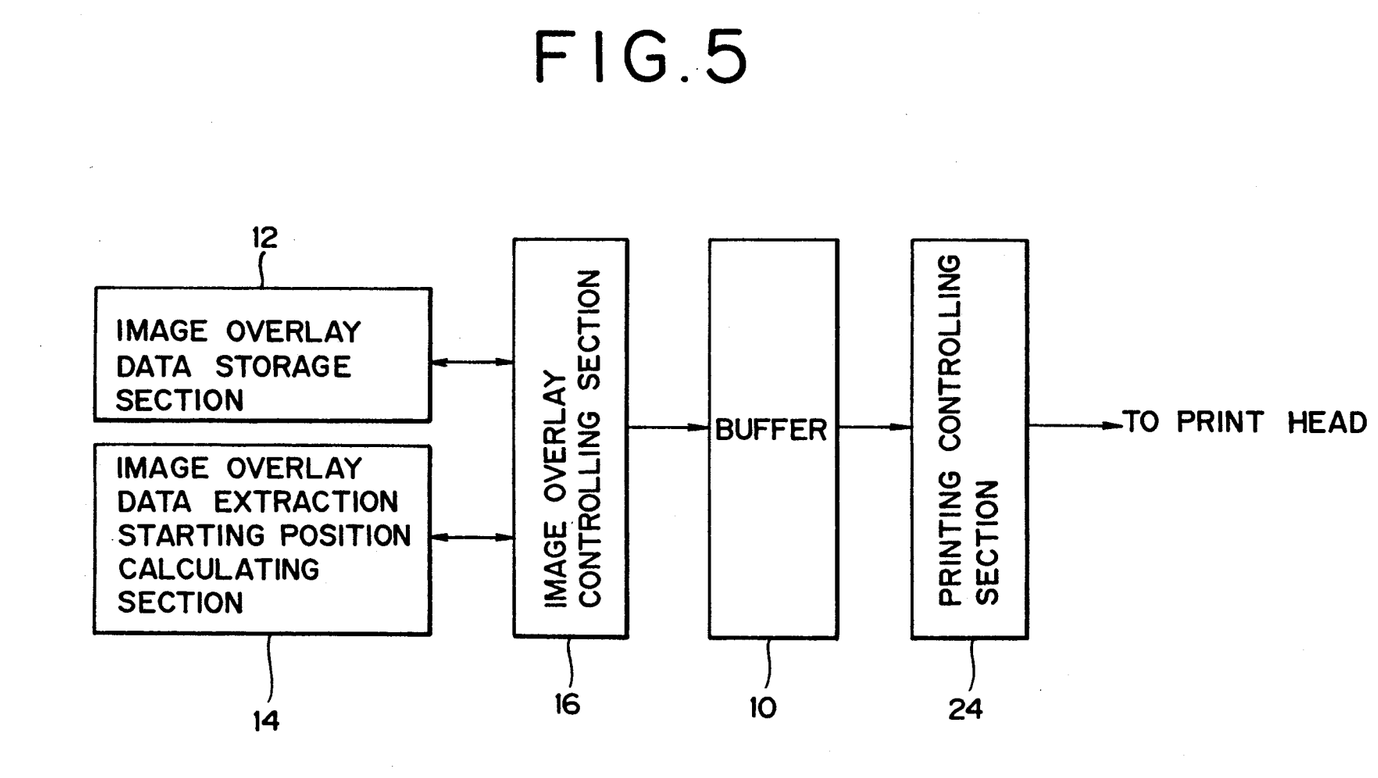
FIG. 5 is a block diagram illustrating a principle of construction of a controlling apparatus of the present invention.
Figure 6:
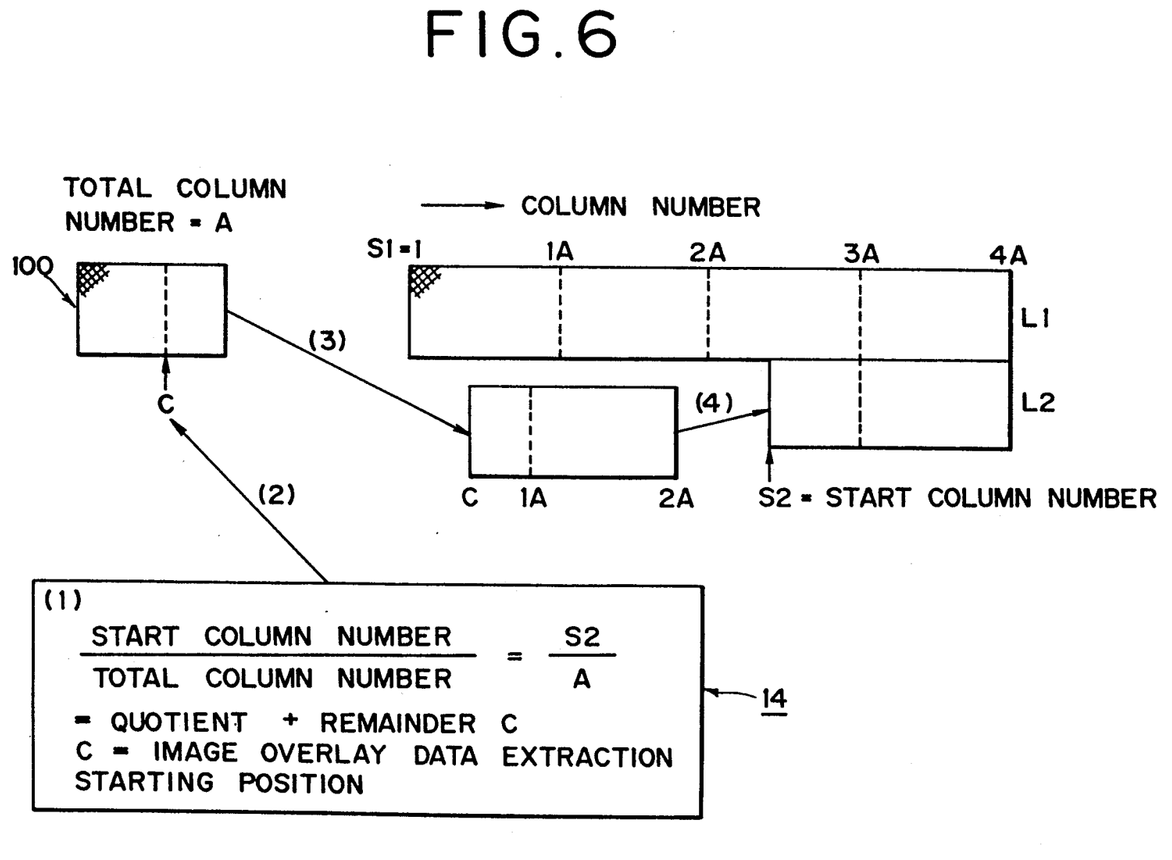
FIG. 6 is a diagrammatic representation illustrating a principle of a controlling method of the present invention.

Referring first to FIGS. 5 and 6, a principle of the present invention will be described. A printing controlling apparatus of the present invention has such components as shown in a block diagram of FIG. 5, and the present invention is directed to a dot printer which carries out printing using print data stored in a buffer 10. The printing controlling apparatus of the present invention includes an image overlay data storage section 12 having image overlay basic data 100 for a total number of columns equal to "A" stored therein, and a calculating section 14 for calculating, in case image overlay start columns for adjacent upper and lower print lines are different from each other when image overlay printing is to be effected continuously for at least two print lines, a remainder C for a quotient of (start column number)/(total column number)=S2/A as an image overlay extraction starting position.

Then, the image overlay controlling section 16 extracts the image overlay basic data 10 starting from a column of the latter designated by the value C calculated by the image overlay data extraction starting position calculating section 14 and stores the thus extracted image overlay basic data 10 into the butter 10, and then the printing controlling section 24 develops a command to a print head to carry out printing. Consequently, a result of printed image overlay patterns for a plurality of print lines which are continuous in the upward and downward directions can be obtained. In this manner, according to the present invention, even if image overlay start columns are different between adjacent upper and lower lines, image overlay patterns can be linked at boundary portions of the print lines with certainty, and the quality of image overlay print can be improved significantly.

An embodiment of the present invention based on the principle described above will be described with reference to FIGS. 7 to 9.

Figure 7:
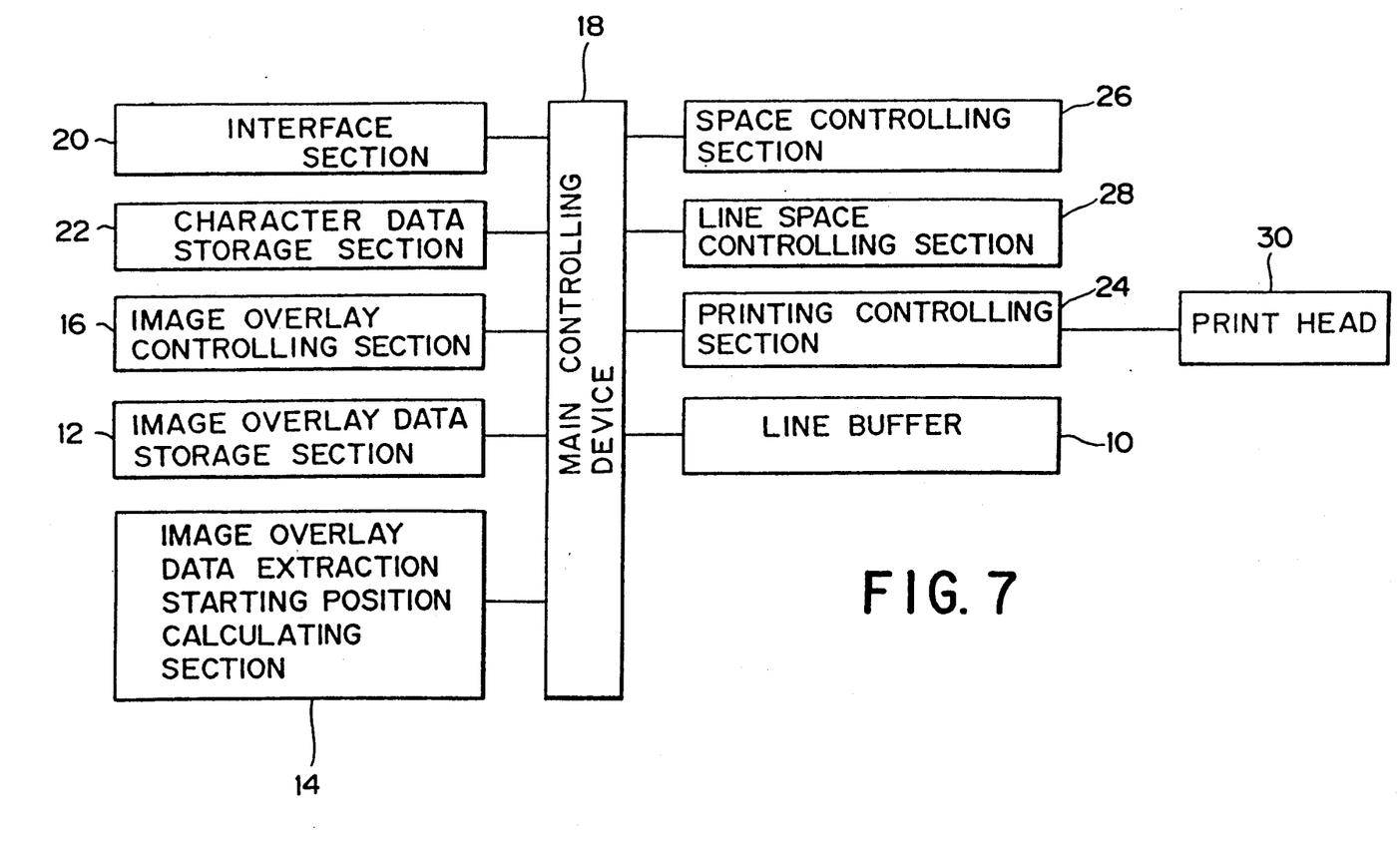
FIG. 7 is a block diagram showing a controlling apparatus of an embodiment of the present invention.

A controlling apparatus for a printer of the embodiment of the present invention includes, similarly to the conventional controlling apparatus shown in FIG. 2, a main controlling device (MPU) 18 for controlling internal processing operation, an interface controlling section 20 for the interface with the outside, a character data storage section 22 having predetermined character dot patterns stored therein, a printing controlling section 24 for controlling operation of printing processing, a space controlling section 26 for controlling a spacing operation upon printing processing, a line space controlling section 28 for controlling a line spacing operation, a line buffer 10 for storing print data therein, and a print head 30 for printing print data stored in the line buffer 10 under the control of the printing controlling section 24.

In addition to the components specified as above, the controlling apparatus includes, for the image overlay printing, an image overlay data storage section 12, an image overlay data extraction starting position calculating section 14, and an image overlay controlling section 16.

The image overlay data storage section 12 has stored therein image overlay basic data 100 which make basic data for the image overlay printing. The total number "A" of columns of such image overlay basic data 100 is, for example, "A"=10. Accordingly, the image overlay controlling section 16 repetitively transfers the image overlay basic data 100 by a number corresponding to an image overlay column number in accordance with a column number for a print line for which image overlay printing is to be effected, that is, in accordance with a start column and an end column, from the image overlay data storage section 12 to the line buffer 10. Then, after image overlay data for a designated image overlay area are thus prepared in the line buffer 10, the printing controlling section 24 controls the print head 30 to carry out image overlay printing in accordance with the image overlay data stored in the line buffer 10.

While the image overlay data storage section 12 and the image overlay controlling section 16 are similar in construction and function to those of the conventional controlling apparatus shown in FIG. 2, the controlling apparatus of the present invention further includes the image overlay data extraction starting position calculating section 14. The image overlay data extraction starting position calculating section 14 calculates from which column of the image overlay basic data 100 stored in the image overlay data storage section 12 extraction of data is to be started.

Figure 8:
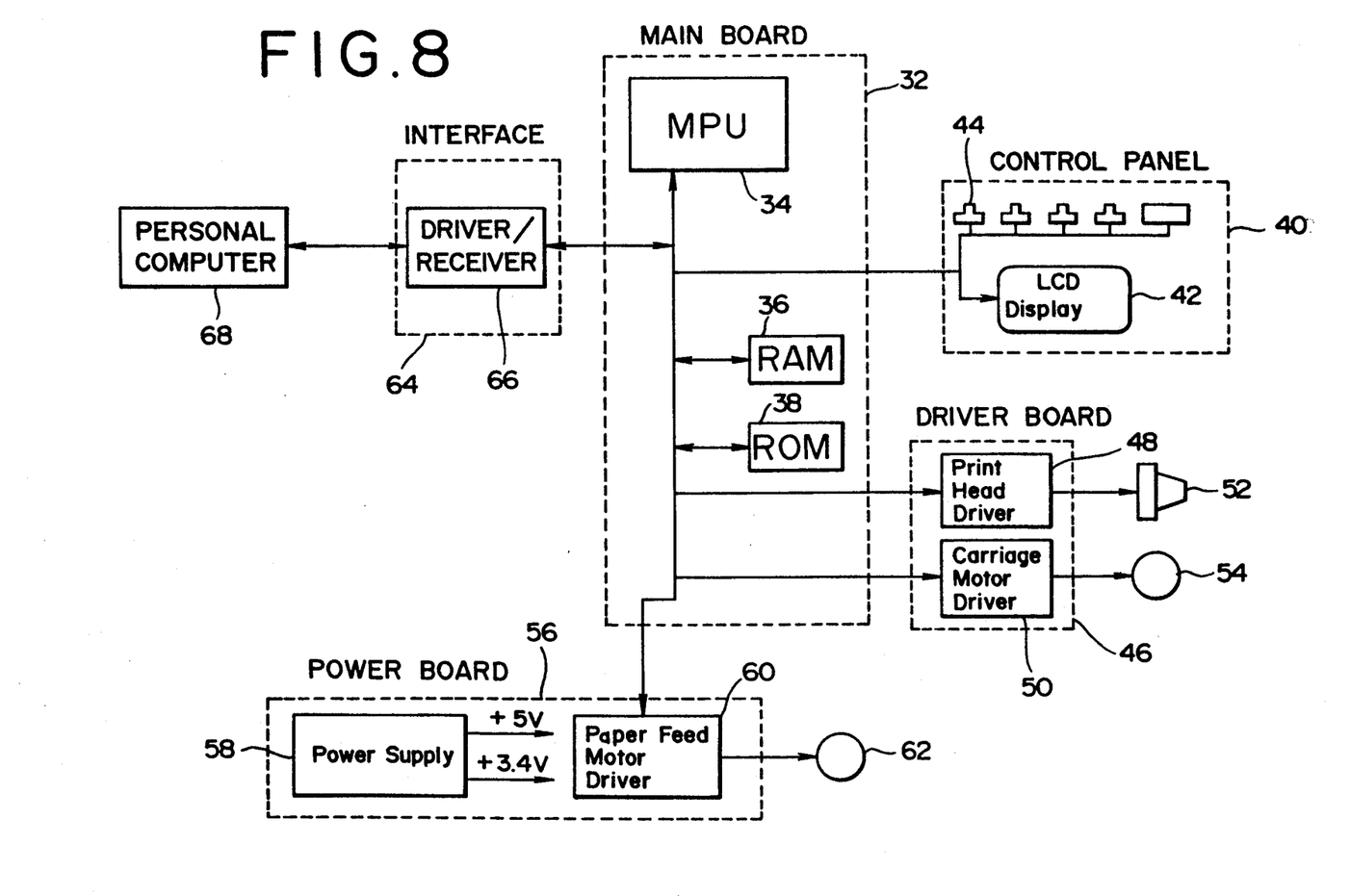
FIG. 8 is a block diagram showing detailed construction of the controlling apparatus of FIG. 7.

FIG. 8 diagrammatically shows general construction of the printer including the controlling apparatus of the embodiment of the present invention shown in FIG. 7. A main board 32 includes an MPU 34, a RAM 36 and a ROM 38. The MPU 34 substantially corresponds to the main controlling device 18 of FIG. 7 and includes the other controlling sections such as the image overlay controlling section 16, printing controlling section 24 and so forth. The ROM 38 includes the image overlay data storage section 12 and character data storage section 22 of FIG. 7. The RAM 36 includes the line buffer 10.

A control panel 40 has an LCD display 42 and a plurality of key switches 44 provided thereon. A driver board 46 includes a print head driver 48 and a carriage motor driver 50 for driving a print head 52 and a carriage motor 54, respectively. A power board 56 includes a power supply 58 for supplying a power to the printer, and a paper feed motor driver 60 for driving a paper feed motor 62. An interface 64 includes a driver/receiver 66, and the printer including the controlling apparatus of the present invention is connected to a personal computer 68 by way of the interface 64.

In the following, a principle of calculation by the image overlay data extraction starting position calculating section 14 will be described with reference to FIG. 9.

Figures 9, 10:
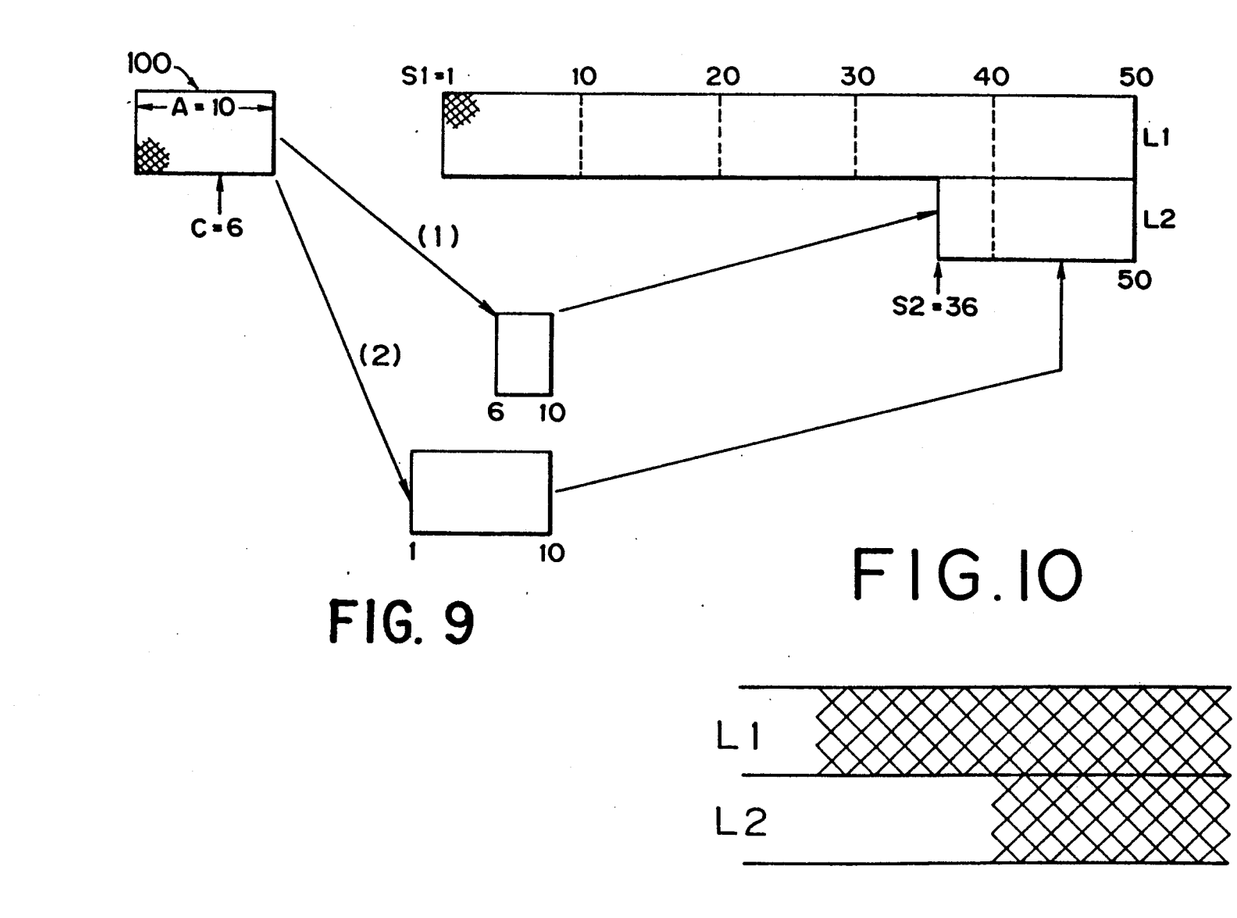
FIG. 9 is a diagrammatic representation illustrating an image overlay printing controlling method employed in the controlling apparatus of FIG. 7.
FIG. 10 is a diagrammatic representation showing a mesh pattern obtained by image overlay printing continuously between adjacent two print lines in accordance with the controlling method of the present invention.

FIG. 9 illustrates a case wherein image overlay printing is first effected from the first column to the 50th column for an upper print line L1 and then image overlay printing is effected for the 36th column to the 50th column for a next print line L2, but start columns of image overlay printing are $S1=1$ and $S2=36$ and thus different from each other between the upper and lower print lines.

When image overlay printing is to be carried out for the lower print line L2 of the upper and lower print lines L1 and L2 wherein the start columns for image overlay printing are different from each other, the image overlay data extraction starting position calculating section 14 of FIG. 7 executes a calculation of $$(\text{start column number S2})/(\text{total column number A}) = \text{quotient} + \text{remainder C} \quad (1)$$

where A is a total number of columns of the image overlay basic data 100 and S2 is a start column for the lower print line, thereby obtaining a value C which indicates from which column of the image overlay basic data 100 extraction of data is to be started. In particular, a value C of the remainder when the column S2 from which image overlay printing is to be started is divided by the total column number "A" of the image overlay basic data 100 is calculated as a value which indicates from which column of the image overlay basic data 100 extraction of data is to be started.

Referring again to FIG. 7, the value C calculated by the image overlay data extraction starting position calculating section 14 is transmitted to the image overlay contolling section 16. The image overlay controlling section 16 thus starts extraction of data from that column position of the image overlay basic data 100 stored in the image overlay data storage section 12 which is provided by the calculated value C, and the thus extracted data are transferred to the line buffer 10.

In the following, operation of the embodiment of FIG. 7 will be described more in detail using such specific values as shown in FIG. 9.

It is assumed now that the total column number "A" of the image overlay basic data 100 stored in the image overlay data storage section 12 is 10 and image overlay printing is effected first from the first column to the 50th column for the upper print line L1 and then from the 36th column to the 50th column for the adjacent lower print line L2.

Here, since the total column number "A" of the image overlay basic data is 10 and and the start column S2 for the lower print line L2 is 36, the image overlay data extraction starting position calculating section 14 calculates a remainder C=6 in accordance with the expression (1) above. The calculated value C represents an image overlay data extraction starting position. Thus, the image overlay controlling section 16 receives the calculated value C=6 from the image overlay data extraction starting position calculating section 14 and starts extraction of data from the sixth column of the image overlay basic data 100 designated by the calculated value C as indicated by an arrow mark (1) in FIG. 9. The thus extracted data are stored into the line buffer 10 so that image overlay data are allotted to the 36th column to the 40th column. Then, for the remaining 10 columns from the 41st column to the 50th column, the image overlay basic data 100 are extracted as they are from the head position as indicated by another arrow mark (2) in FIG. 9 and are transferred to the line buffer 10 so that they are allotted to the 41st column to the 50th column.

As a result, an array of data at boundary portions from the 36th column to the 50th column where image overlay prints of the upper print line L1 and the lower print line L2 are overlapped with each other is such, when represented by column numbers of the image overlay basic data 100, as follows:

L1: "6, 7, 8, 9, 10, 1, . . . , 10"
L2: "6, 7, 8, 9, 10, 1, . . . , 10"

Consequently, the image overlay basic data 100 which have the same column positions are opposed to each other along the image overlay boundary between the upper and lower print lines, thereby linking the image overlay patterns continuously to each other. A print pattern obtained in accordance with the controlling method of the present invention using a mesh pattern as an image overlay pattern is shown in FIG. 10.

It is to be noted that, while in the embodiment described above the total number "A" of the image overlay basic data 100 is 10, naturally the present invention is not restricted to such specific number.

Since the present invention has such a construction as described in detail above, even where image overlay start columns are different between adjacent upper and lower print lines, image overlay patterns can be continuously linked with certainty at boundary portions of the upper and lower columns, and consequently, the quality of image overlay print can be improved significantly.

What is claimed is:

1. An image overlay printing controlling apparatus for a printer which prints using print data stored in a buffer, comprising;

image overlay storage means having image overlay basic data for a predetermined total number of columns stored therein;

means for calculating, in case image overlay start columns for adjacent upper and lower print lines when image overlay printing is to be effected continuously for at least two print lines are different from each other, a value of a remainder to be obtained by dividing the image overlay start column for the lower print line by the total column number of the image overlay basic data as an image overlay data extraction starting position; and image overlay controlling means for starting extraction of data from a column of the image overlay basic data designated by the value of the remainder calculated by said image overlay data extraction starting position calculating means and for producing a printing command after the extracted data are all stored into said buffer.

2. An image overlay printing controlling method for a printer which prints using print data stored in a buffer, comprising the steps of:

storing image overlay basic data for a predetermined total number of columns into image overlay storage means;

calculating, in case image overlay start columns for adjacent upper and lower print lines when image overlay printing is to be effected continuously for at least two print lines are different from each other, a value of a remainder to be obtained by dividing the image overlay start column for the lower print line by the total column number of the image overlay basic data as an image overlay data extraction starting position;

starting extraction of data from a column of the image overlay basic data designated by the value of the remainder; and producing a printing command after the extracted data are all stored into said buffer.

* * * * *